W. A. STARK.
Gleaner and Hay-Rake.
No. 221,626. Patented Nov. 11, 1879.
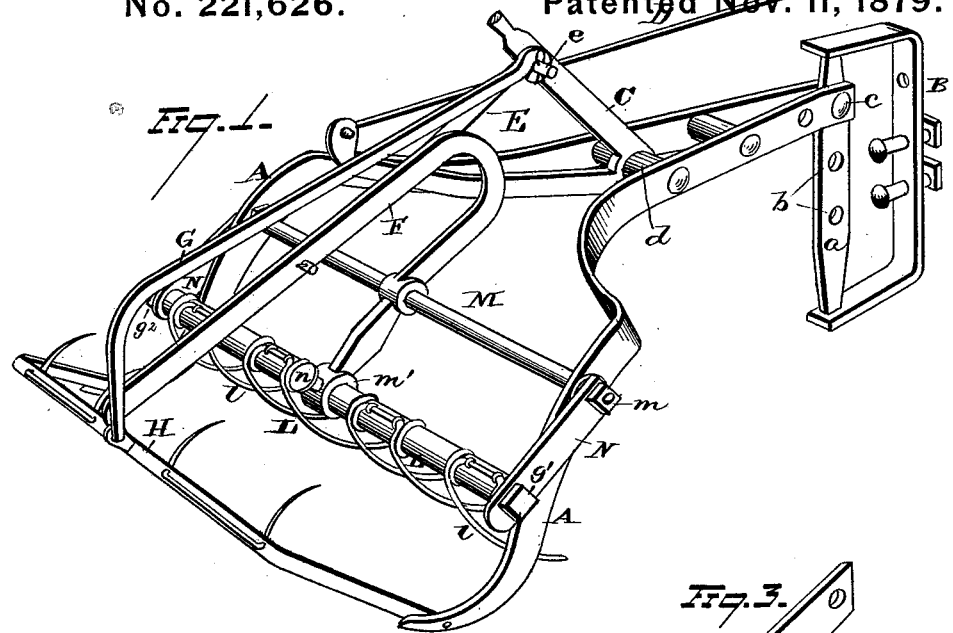
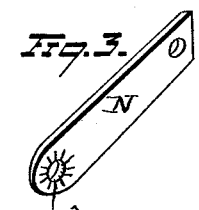
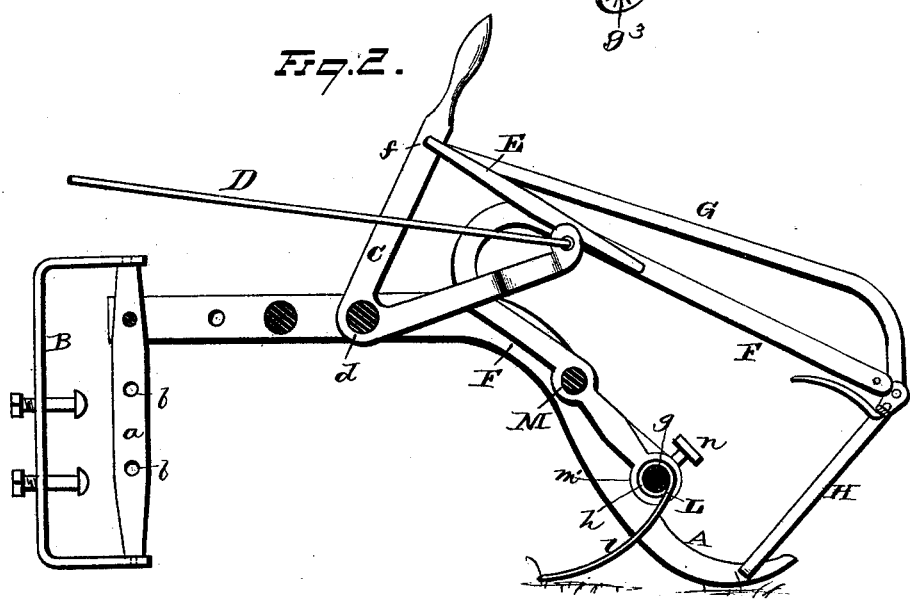
WITNESSES
E. J. Nottingham
A. W. Bright
INVENTOR
W. A. Stark.
By H. A. Seymour,
ATTORNEY

UNITED STATES PATENT OFFICE.

WILLIAM A. STARK, OF BETHANY, ILLINOIS.

IMPROVEMENT IN GLEANERS AND HAY-RAKES.

Specification forming part of Letters Patent No. 221,626, dated November 11, 1879; application filed September 22, 1879.

*To all whom it may concern:*

Be it known that I, WILLIAM A. STARK, of Bethany, in the county of Moultrie and State of Illinois, have invented certain new and useful Improvements in Gleaners and Hay-Rakes; and I do hereby declare the following to be a full, clear, and exact description of the invention, such as will enable others skilled in the art to which it pertains to make and use it, reference being had to the accompanying drawings, which form part of this specification.

My invention relates to certain improvements in wheat-gleaners and hay-rakes, and is designed for use in either capacity, as desired.

In instance of use as a gleaner it may be attached to any reaper in the rear of and just outside of the line of the dropping attachment, so that the gleaned wheat may be dropped in bundles alongside of the wheat just reaped, ready for binding.

In instance of use as a hay-rake the machine will preferably be made larger, so as to work a greater area of ground than is necessary in gleaning wheat. It may be attached to a farm-truck, such as cultivator-wheels or other wheeled device.

The invention consists in the construction hereinafter described and claimed.

In the drawings, Figure 1 is a view in perspective. Fig. 2 is a longitudinal section, showing in elevation the side opposite to that seen in the preceding view. Fig. 3 is a detail view.

The two rake-runners A have their forward ends formed in approaching curves, which embrace at their extremities the swivel-coupling B. This coupling permits the machine to be turned squarely around at corners, and thus avoid interference with the fence or other obstacle. Its rear vertical bar, $a$, is provided with a longitudinal series of holes, $b$, by which the coupling is secured to the runner extremities in vertical adjustment by means of a pivot, $c$. This swivel may be bolted to the shield of the pitman-pinion when used in connection with the Buckeye reaper; or it may be bolted to suitable rods which connect it with the reaper.

A double crank, C, is pivoted centrally between the curved forward ends of the rake-runners by means of a transverse rod, $d$, on which the double crank has movement in a vertical plane. One arm of said double crank is provided with a connecting-rod, D, which latter extends to any convenient point to be operated. In case of gleaning wheat this rod may be engaged with a hand-lever located on the left-hand side of the driver's seat in a reaper. In case of raking hay said rod may be operated directly by the driver's hand, or by any suitable intervening device. The other arm of the double crank is provided with connecting mechanism, which actuates the rake and clearer, respectively, as follows: A link, E, has its rear end connected with a goose-neck lever, F, while its opposite end is formed with an angular stem, $e$, which works in a hole, $f$, formed in said crank-arm. On this stem is pivoted the forward end of the crane G, whose opposite end connects with the clearer. This vibrating clearer H is pivoted to the rear upturned ends of the rake-runners, and has simultaneous reverse action relative to the vibrating rake L. This latter consists of a metal rod, $g$, over which is fitted a wooden sleeve, $h$, and to the latter are securely fastened the double spring-teeth $l$. One end of this metal rod is provided with a rigid head, $g'$, while the opposite end is screw-threaded and provided with a nut, $g^2$. The inner face of the link-bar, which engages with the tapped end of the metal rod, is notched or roughened, as shown at $g^3$, and the sleeve end is clamped against this roughened face by the nut $g^2$. The lower arm of the goose-neck lever has pivotal movement on the central portion of a transverse rod, M, which latter has its extremities $m$ projecting from the sides of the respective rake-runner.

Link-bars N have their forward extremities secured by nuts on said rod extremities, while their opposite extremities connect with the extremities of rod $g$, which likewise project beyond the side of said rake-runners.

The extremity of the lower arm of the goose-neck is formed with a collar, $m'$, which fits about the central portion of sleeve $h$ of the rake-head. This collar is provided with a set-screw, $n$.

To adjust the rake-head, nut $g^2$ is loosened so as to free the sleeve end from being clamped against the roughened face $g^3$ of the corresponding link-bar N. Set-screw $n$ is also loosened in its collar. The rake-head can then be rotated about its longitudinal axis, and nuts $g^2$ and $n$ are then again tightened, the construction of parts being such that the rake-head may be adjusted so as to place the teeth in any desired normal inclination.

If desired, for raking hay the rear end of the goose-neck may be provided with a weight bolted thereto.

It will be observed that each tooth is fastened by two staples, which embrace the rake-head, and thus impart spring and strength to the teeth.

Having fully described my invention, what I claim as new, and desire to secure by Letters Patent, is—

1. The combination, with the rake-runners and the vibrating clearer pivoted thereto, of the vibrating rake, the double-crank lever, and the mechanism which connects said double crank respectively to the rake and clearer, substantially as set forth.

2. The combination, with the clearer, rake, and double-crank lever, of the crane which connects the latter to the clearer, and the goose-neck lever which connects said double crank to the rake, substantially as set forth.

3. The combination, with runners having converging forward extremities and a vertically-swinging bar pivoted between the latter, of a forward bar having rearwardly-bent extremities, to which the upper and lower ends of the rear bar are respectively pivoted, the vertical portion of said forward bar being adapted to be connected to a harvester or truck, substantially as set forth.

4. The combination, with the transverse rod which fulcrums the goose-neck lever, and whose extremities project beyond the runner sides, of the rake-head rod having like projecting extremities, the sleeve fitted over the latter rod, and the link-bars which connect said rod-extremities, one of the link-bars being formed with a notched or corrugated surface, against which the corresponding sleeve end is adapted to be clamped, substantially as set forth.

5. The combination, with the transverse rod on which the goose-neck lever is fulcrumed, and whose extremities project beyond the runner sides, the rake-head rod whose extremities likewise project beyond the runners, and the link-bars which connect said projecting ends, of the sleeve fitted over said rake-head rod, the spring-teeth fastened to the latter, the collar formed on said goose-neck, and the set-screw which clamps the sleeve, substantially as set forth.

In testimony that I claim the foregoing I have hereunto set my hand this 13th day of September, 1879.

WILLIAM A. STARK.

Witnesses:
 JOHN H. WAGGONER,
 WILLIAM F. SMITH.